United States Patent Office 2,758,129
Patented Aug. 7, 1956

2,758,129

PREPARATION OF PHTHALONITRILES

Norman L. Jennings, Texas City, Tex., assignor to Monsanto Chemical Company, St. Louis, Mo., a corporation of Delaware No Drawing. Application February 26, 1954,
Serial No. 412,947

10 Claims. (Cl. 260—465)

This invention is directed to a process for the production of phthalonitriles by the reaction of benzonitrile and hydrocyanic acid.

Several methods, both catalytic and non-catalytic, have been proposed and developed for the production of aromatic dinitriles. The one in more general use is the catalytic vapor-phase reaction of the dicarboxylic acids or their corresponding anhydrides or imides with ammonia. While it is an effective process on a commercial scale, it requires very careful control during operation as well as elaborate and expensive equipment. Another method in current use involves the dehydration of carboxylic acid amides, imides, or ammonium salts in solution in a tertiary base by means of phosgene or halogen compounds of phosphorus and sulfur. The cost of the starting materials and the number of steps involved in such a process, however, make this method somewhat impractical in large-scale operations. In another method where aromatic halogen-containing compounds are reacted with hydrogen cyanide in the presence of a metallic catalyst, significant amounts of hydrogen halide by-products are produced along with the desired product and the process is economically feasible only where there is an established outlet or market for such by-products.

A simple, relatively inexpensive, and efficient process which overcomes many of the disadvantages of the prior art processes is that in which phthalonitriles are prepared by the reaction of benzonitrile and hydrocyanic acid. In this process, however, the isomer distribution leaves something to be desired in that the ratio of the para-isomer, the most valuable commercially of the three isomers, to the other isomers is somewhat low.

It is an object of the present invention, therefore, to provide an improved process for the production of aromatic dinitriles from benzonitrile and hydrocyanic acid.

It is a further object of the invention to provide an improved process for the production of aromatic dinitriles from benzonitrile and hydrocyanic acid whereby the isomer distribution of the product nitriles may be controlled to produce greater yields of the para-isomer.

Other objects and advantages of the invention will become apparent from the following description and the appended claims.

According to the invention, a mixture of phthalonitriles is prepared by passing a mixture of the vapors of hydrocyanic acid and benzonitrile over a dehydrogenation catalyst containing as the active ingredient a metal or the oxide of a metal chosen from the group consisting of platinum, rhodium and palladium deposited on a suitable support or carrier at elevated temperatures in the range from 500–1200° C. The reaction is carried out at an average reaction temperature of at least 500° C., and preferably at an average temperature within the range from 900–950° C. Temperatures as high as 1100–1200° C. may be used, but the yields are reduced somewhat at these higher temperatures.

In the preferred mode of operation the reactants are maintained at substantially atmospheric pressures. If desired, however, pressures may be materially reduced below atmospheric, or raised to superatmospheric levels without affecting the desired reaction.

In carrying out the reaction, contact time between reactants and catalyst at reaction temperature may vary widely. Preferred contact times will vary with the temperatures to which the reaction mixture is heated. Generally, a contact time of from about 2 to about 10 seconds is satisfactory. For maximum yields and efficiency, a contact time in the range from about 5 to about 8 seconds appears to be optimum.

Although the ratio of reactants is not critical, an excess of hydrocyanic acid over that required for reaction with benzonitrile is preferred. Ratios ranging from 1–10 moles of hydrocyanic acid for every mole of benzonitrile are suitable, with a ratio of 4 moles of hydrocyanic acid to every mole of benzonitrile being preferred. Carbonization of the hydrocyanic acid occurs if too high ratios are employed, while excessively low rates tend to give low yields of the dinitriles. Any excess hydrocyanic acid employed may be readily recovered for re-use.

*Example I*

A ½-in. stainless steel tube, 2 ft. long, externally heated by means of an electric furnace was employed as the reactor. Benzonitrile and hydrocyanic acid, in the ratio of four moles of hydrocyanic acid to every mole of benzonitrile, were passed through the reactor heated to a temperature of approximately 950° C. at a rate of approximately 30 cc. per second so that residence time in the reactor tube was approximately 10 seconds.

The reaction products leaving the reactor were condensed in an ice-water condenser and two Dry-Ice traps. The condensate was subjected to distillation at atmospheric pressure to remove unreacted benzonitrile and the dinitrile fraction was then recovered by distillation at reduced pressure (150 mm. of Hg absolute). A yield of mixed phthalonitriles of approximately 60% was obtained.

A sample of this product was analyzed by infrared techniques and found to have the following isomer distribution:

|   | Percent |
|---|---|
| Ortho-dicyanobenzene (phthalonitrile) | 10 |
| Meta-dicyanobenzene (isophthalonitrile) | 55 |
| Para-dicyanobenzene (terephthalonitrile) | 35 |

*Example II*

Following the procedure outlined in Example I, a series of experiments were conducted in which a 6-in. section of the reactor tube was packed with various catalysts. Wall temperature of the reactor was maintained at 900–950° C. and flow rates were regulated to provide a residence time in the reactor of from 10–20 seconds. Reaction products were recovered as in Example I and the dinitrile fraction was analyzed by infrared techniques. Results of these experiments are tabulated below.

| Catalyst | Yield of Mixed Phthalonitriles, Percent | Isomer Distribution | | |
|---|---|---|---|---|
| | | Ortho, Percent | Meta, Percent | Para, Percent |
| 80% Platinum—20% Rhodium on natural beryl | 75 | 0.0 | 51.0 | 49.0 |
| Palladium on 4–8 mesh alumina | 50 | 4.0 | 56.0 | 40.0 |
| Platinum oxide on boiling stones (silica) | 50 | 0.0 | 53.0 | 47.0 |
| Palladium on boiling stones (silica) | 50 | 0.0 | 56.0 | 44.0 |

It is obvious from a comparison of the results in the preceding examples that the use of a dehydrogenation catalyst results in a significant increase in the para-isomer content of the product.

The catalysts of the invention are readily and easily prepared in the manner commonly employed for the preparation of similar dehydrogenation catalysts. The metals may be precipitated directly onto the inert carrier from salts such as the chloride by treating the latter with formaldehyde and a base, for example, or by any of a number of other well known means. In the case of the oxide catalysts, the supports or carriers used are readily impregnated by mechanical means such as evacuating the carrier, thoroughly agitating it with a slurry of the oxide in water, and then opening the whole to the atmosphere, and drying or evaporating the water. In addition to silica and alumina mentioned in the examples, other suitable carriers which may be mentioned are asbestos, activated carbon, pumice, kieselguhr, and the like.

It will be obvious to one skilled in the art that it is not necessary to use a stainless steel tube but any reaction tube resistant to the relatively high temperatures of the reaction such as quartz, nickel or metal alloys, such as that known to the trade as Inconel, and the like will be suitable for the reaction.

What is claimed is:

1. A process for the production of phthalonitriles which comprises reacting benzonitrile and hydrocyanic acid in the vapor phase at a temperature from about 500 to about 1200° C. in the presence of a dehydrogenation catalyst containing as the active ingredient a metal chosen from the group consisting of platinum, rhodium and palladium and the oxides of said metals deposited on a carrier.

2. A process for the production of phthalonitriles which comprises reacting benzonitrile and hydrocyanic acid in the proportions of four moles of hydrocyanic acid for every mole of benzonitrile in the vapor phase at a temperature from about 900 to about 950° C. and in the presence of a dehydrogenation catalyst containing as the active ingredient a metal chosen from the group consisting of platinum, rhodium and palladium and the oxides of said metals deposited on a carrier.

3. A process for the production of phthalonitriles which comprises reacting benzonitrile and hydrocyanic acid in the proportions of one to ten moles of hydrocyanic acid for every mole of benzonitrile in the vapor phase at a temperature from about 500 to about 1200° C. and in the presence of a dehydrogenation catalyst containing as the active ingredient palladium deposited on silica.

4. A process for the production of phthalonitriles which comprises reacting benzonitrile and hydrocyanic acid in the proportions of one to ten moles of hydrocyanic acid for every mole of benzonitrile in the vapor phase at a temperature from about 500 to about 1200° C. and in the presence of a dehydrogenation catalyst containing as the active ingredient platinum oxide deposited on silica.

5. A process for the production of phthalonitriles which comprises reacting benzonitrile and hydrocyanic acid in the proportions of one to ten moles of hydrocyanic acid for every mole of benzonitrile in the vapor phase at a temperature from about 500 to about 1200° C. and in the presence of a dehydrogenation catalyst containing as the active ingredient palladium deposited on alumina.

6. A process for the production of phthalonitriles which comprises reacting benzonitrile and hydrocyanic acid in the proportions of one to ten moles of hydrocyanic acid for every mole of benzonitrile in the vapor phase at a temperature from about 500 to about 1200° C. and in the presence of a dehydrogenation catalyst containing as the active ingredient a mixture of platinum and rhodium deposited on natural beryl.

7. A process for the production of phthalonitriles which comprises passing a reaction mixture of vaporized benzonitrile and hydrocyanic acid gas containing four moles of hydrocyanic acid gas to every mole of vaporized benzonitrile through a bed of dehydrogenation catalyst containing as the active ingredient a metal chosen from the group consisting of platinum, rhodium, and palladium and oxides of said metals deposited on a carrier maintained at a temperature from about 500 to about 1200° C. at such a rate that the contact time is from about 2 to about 10 seconds.

8. A process for the production of phthalonitriles which comprises passing a reaction mixture of vaporized benzonitrile and hydrocyanic acid gas containing four moles of hydrocyanic acid gas to every mole of vaporized benzonitrile through a bed of dehydrogenation catalyst containing as the active ingredient palladium deposited on silica maintained at a temperature from about 500 to about 1200° C. at such a rate that the contact time is from about two to about ten seconds.

9. A process for the production of phthalonitriles which comprises passing a reaction mixture of vaporized benzonitrile and hydrocyanic acid gas containing four moles of hydrocyanic acid gas to every mole of vaporized benzonitrile through a bed of dehydrogenation catalyst containing as the active ingredient a mixture of platinum and rhodium deposited on natural beryl maintained at a temperature from about 500 to about 1200° C. at such a rate that the contact time is from about two to about ten seconds.

10. A process for the production of phthalonitriles which comprises passing a reaction mixture of vaporized benzonitrile and hydrocyanic acid gas containing four moles of hydrocyanic acid gas to every mole of vaporized benzonitrile through a bed of dehydrogenation catalyst containing as the active ingredient platinum oxide deposited on silica maintained at a temperature from about 500 to about 1200° C. at such a rate that the contact time is from about two to about ten seconds.

References Cited in the file of this patent

UNITED STATES PATENTS

| | | |
|---|---|---|
| 2,449,643 | Cosby | Sept. 21, 1948 |
| 2,503,641 | Taylor et al. | Apr. 11, 1950 |
| 2,591,415 | Engelhardt et al. | Apr. 1, 1952 |